United States Patent [19]

Gläser

[11] Patent Number: 4,684,148
[45] Date of Patent: Aug. 4, 1987

[54] PERAMBULATOR

[75] Inventor: Dieter Gläser, Dachau, Fed. Rep. of Germany

[73] Assignee: PEG Perego-Pines S.P.A., Italy

[21] Appl. No.: 835,536

[22] Filed: Mar. 3, 1986

[30] Foreign Application Priority Data

Sep. 12, 1985 [DE] Fed. Rep. of Germany ..... 33532594

[51] Int. Cl.$^4$ ............................................. B60B 33/02
[52] U.S. Cl. .................................. 280/647; 16/35 R;
                                                          280/47.36
[58] Field of Search ............ 16/35 R; 280/650, 47.38,
                                       280/47.36, 647, 641, 642

[56] References Cited

U.S. PATENT DOCUMENTS

| 3,061,328 | 10/1962 | Konar | 280/650 |
| 3,206,223 | 9/1965 | Frye | 16/35 R |
| 3,431,584 | 3/1969 | Maslow | 16/35 R |
| 4,483,042 | 11/1984 | Dieter | 16/35 R |
| 4,570,288 | 2/1986 | Kassai | 16/35 R |
| 4,575,896 | 3/1986 | Nakao et al. | 16/35 R |

FOREIGN PATENT DOCUMENTS

| 0023432 | 2/1981 | European Pat. Off. |
| 1929491 | 12/1965 | Fed. Rep. of Germany |
| 3137433 | 4/1983 | Fed. Rep. of Germany |
| 3506077 | 8/1985 | Fed. Rep. of Germany |

Primary Examiner—John J. Love
Assistant Examiner—Michael Mar
Attorney, Agent, or Firm—McGlew and Tuttle

[57] ABSTRACT

The invention relates to a perambulator having a collapsible frame and a hinged pushing handle for pushing the perambulator forwards or backwards. At least four wheels are mounted at lower portions of the frame. For achieving good curve negotiating properties and maneuverability of the perambulator in combination with its versatility, each of the four wheels is designed as a trailing caster mounted for swiveling about an upright axis and adapted to be locked in position by a respective locking member.

12 Claims, 4 Drawing Figures

PERAMBULATOR

FIELD AND BACKGROUND OF THE INVENTION

The present invention relates to a perambulator having a collapsible frame and a hinged pushing handle for pushing the perambulator forwards or backwards, and at least four wheels mounted at a lower portion of said frame.

Perambulators of this type have already been in practical use for some time. The hinged pushing handle may be pivoted for pushing the perambulator in the forward or rearward direction. In some of these perambulators the seat structure is likewise adjustable, permitting the perambulator to be selectively used as a baby carriage or an infant's seat carriage.

Perambulators of this type suffer from the disadvantage, however, that the negotiation of narrow curves offers difficulties.

Also known on the other hand are infant's seat carriages having for instance their front wheels designed as so-called trailing casters with locking means for locking the trailing casters swiveling about an upright axis. These infant's seat carriages are also provided for each of their trailing casters. With these perambulators it is possible to negotiate narrow curves or to manoeuver in confined spaces.

SUMMARY OF THE INVENTION

The versatility of a perambulator or infant's seat carriage of this type is rather restricted, however, in view of the fact that the vehicle is used by children only over a very limited period of time.

It is therefore an object of the invention to improve a perambulator of the type defined in the introduction so as to achieve good curve negotiating properties and manoeuverability in combination with a high degree of versatility.

For attaining this object, the invention provides that each of the four wheels is formed as a trailing caster mounted to swivel about a respective upright axis and adapted to be locked by respective locking means.

This solution is surprisingly simple and ensures good curve negotiating properties and manoeuverability of the perambulator while maintaining its versatility. Depending on the position to which the hinged pushing handle is adjusted, the user may lock the respective rear wheels in the riding direction, so that the front wheels in that riding direction remain free to swivel. For travel of the perambulator at a normal riding speed, all of the wheels may be locked by the associated locking means for avoiding wheel flutter.

The locking of the wheels is effectively facilitated by the provision that the locking means associated with each pair of wheels mounted on transverse axes aligned with one another in the straight-ahead riding position are connected to one another by a connecting bar. In the locked condition of the respective pair of wheels, the connecting bar contributes to the stability of the wheel pair and thus to its track-keeping capability.

According to an advantageous embodiment of the invention, each of said locking means is provided on an axle support of the respective wheel, each locking means comprising a recess and a locking member adapted to be received in said recess, the locking member or the recess being of convergent configuration in the engagement direction.

The provision that the locking means comprises a recess and a locking member engageable therewith permits the overall locking means to be manufactured at low cost. The provision, furthermore, of a locking member engageable with a recess is particularly advantageous with a view to safe operation and in particular to easy handling by an unskilled user, as the proper handling and operation of the locking means are readily recognized. The convergent configuration of the locking member or the recess in the engagement direction ensures that the locking member and the recess will always be in contact with one another to thereby prevent any play therebetween from occurring. As a result of these provisions, the stability of the perambulator is improved, and its riding properties are positively affected, as any undesirable oscillation is effectively avoided.

In an advantageous embodiment of the perambulator according to the invention, the recess is formed in the axle support, and the locking member is designed in the form of a lever hingedly mounted on the frame. Since the axle support is usually disposed at a lower portion of the frame, the recess is preferably formed at the top of the axle support so that it faces towards and can be viewed by the user. The design of the locking member in the form of a pivoting lever hinged to the frame results in the actuation of the locking means being considerably facilitated, as such actuation merely requires the lever to be pivoted in the direction towards the recess.

A convergent configuration of the recess permits the employ of a non-convergent lever. As the axle support is usually an injection-molded plastic component, it is possible to form the convergent or tapering recess in a particularly simple and economic manner. A further advantageous embodiment is achieved by providing that at least the portion of the lever to be engaged with the recess is of circular cross-sectional shape. This embodiment permits the lever to be economically manufactured of a round bar stock, the semicircular portion of the circular profile facing towards the recess converging in the engagement direction to thereby avoid the occurrence of play therebetween.

In a particularly advantageous embodiment of the perambulator, the levers of associated pairs of locking means are interconnected by a connecting bar. In this manner it is ensured that the two axles of the respective wheels are aligned with one another in the locked position, whereby to ensure excellent straight-ahead riding properties of the perambulator.

In order to ensure proper contact of the locking member with the recess under all conditions of use, there is advantageously provided a biasing means adjacent the hinged mounting of the lever for biasing the lever in the direction of engagement with the recess. In this manner it is avoided that the lever is released from engagement with the recess as by shocks or vibrations acting on the perambulator. It has also been found advantageous that the biasing means is effective to bias the lever towards a position out of engagement with the recess to thereby prevent the lever from inadvertently moving to its locking position and thus hampering the manoeuverability of the perambulator.

The biasing means advantageously comprises a biasing element mounted for movement parallel to the pivot axis of the lever and biased by a resilient element in the direction towards the lever. This configuration permits the geometry of the biasing element to be suitably adapted to the available space while ensuring optimum efficiency of the biasing element. In this context it is particularly advantageous to design the cross-sectional shape of the biasing element in the form of a circular arc segment having its center at the pivot center of the lever. This permits the biasing element to act on the lever over the full pivoting range thereof, and to be of particularly compact construction.

According to a further advantageous embodiment, the invention provides that the side of the biasing element facing towards the lever is formed with a ramp configuration rising in circumferential direction from the two end portions towards a center portion. This results in the formation of a kind of a crest at the center portion, dividing the pivotal movement of the lever into two sections, namely, one section in which the lever is biased into engagement with the recess, and a second section in which the lever is biased towards its disengaged position. The lever is thus practically prevented from dwelling at intermediate positions, whereby the safety of operation of the entire locking means is considerably improved, as the lever is positively retained in one of its two positions. This embodiment furthermore safely prevents the lever from being moved to or from its locking positions by mechanical vibrations acting on the perambulator.

The perambulator may suitably be designed in such a manner that the front wheels are formed as twin casters disposed on opposite sides of the axle support. The forces transmitted by the casters in the locked condition to act on the locking means are symmetric with respect to the center line of the locking means to thereby ensure particularly safe operation.

In a particularly advantageous embodiment, finally, the invention provides that the portion of the axle support formed with the recess is provided with a ramp configuration rising towards the recess on both sides thereof, and that the portion of the axle support formed with the recess is designed to partially extend over the wheels. This embodiment results in a particularly simple operability of the locking means of the perambulator. The lever may be pivoted to its engagement position with the recess in any position of the wheels, whereupon it is retained in this position by the biasing element. When the perambulator is subsequently pushed straight ahead, the wheels swivel to their aligned position, resulting in the lever riding up on the portion of the axle support extending over the wheels along the ramps formed thereon. In this manner the lever is automatically brought to its locking position without any further operation by the user. As the recess is located within the user's field of view, the attainment of the locked condition can be ascertained in the simplest manner by visual inspection.

BRIEF DESCRIPTION OF THE DRAWINGS

An embodiment of the invention shall now be described by way of example with reference to the accompanying drawings, wherein.

DESCRIPTION OF THE PREFERRED EMBODIMENT

Figure 1:
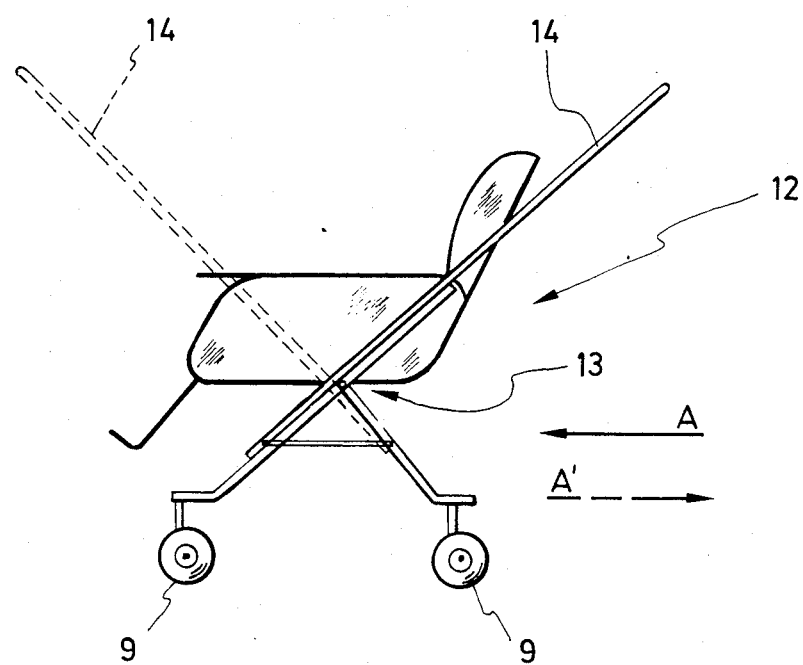
FIG. 1 shows a diagrammatic side elevation of a perambulator according to the invention.

As best shown in FIG. 1, the perambulator 12 according to the invention has a collapsible frame 13 provided with a hinged pushing handle 14 for pushing the perambulator forwards or rearwards as indicated by arrows A and A', and solid and broken lines 14, respectively. Connected to the lower portion of frame 13 are four wheels or wheels sets 9 in the form of trailing casters mounted for swiveling about a respective upright axis. Not shown in FIG. 1 are locking means for individually locking each of the wheels. The locking means shall be described hereinafter with reference to FIGS. 2 to 4, showing one of the front wheel arrangements 9.

Figure 2:
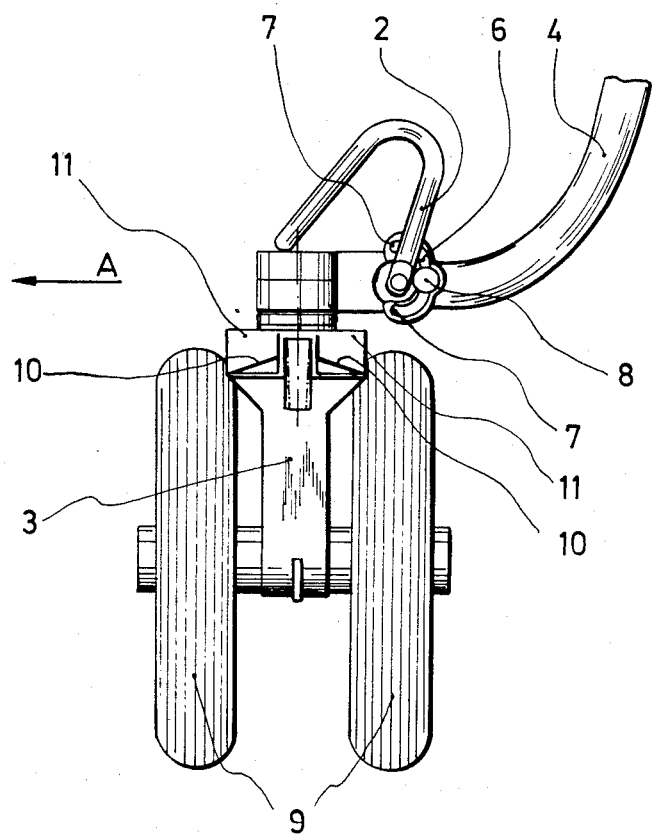
FIG. 2 shows an enlarged sideview of a front end portion of a perambulator frame including a front caster pair mounted thereon and swiveled to a position 90° offset from the riding direction.

Shown in FIG. 2 is a forward lower end portion of a perambulator frame 4, with an axle support 3 mounted thereon for swiveling about a vertical axis. The lower portion of axle support 3 mounts the front wheel arrangement 9 comprising a pair of trailing casters in the example shown. In the view depicted in FIG. 2, the straight-ahead riding direction of the perambulator is indicated by the arrow A pointing to the left. Axle support 3 and the front wheels 9 mounted therein are shown in a position 90° offset from the direction of arrow A. Axle support 3 is of substantially symmetric construction and has its center portion formed with an open-top slot shaped recess 1 the bottom wall of which extends at an angle with respect to the vertical swivel axis. On opposite sides of recess 1 the top surface of axle support 3 is formed with ramps 10 rising from the outer end portions towards the centrally located recess 1. The lateral sides of axle support 3 facing towards wheels 9 are provided with lateral extensions 11 projecting above at least part of each wheel 9. Hingedly mounted on frame portion 4 at a spaced location from the vertical swivel axis is a lever 2 the free length of which is selected so as to permit the lever to be received in recess 1 when axle support 3 is swivelled to the riding direction A. Also mounted on frame portion 4 is a biasing element 6 to be described in detail with reference to FIGS. 3 and 4. Biasing element 6 is mounted for displacement in the direction of the pivot axis of lever 2 and has a cross-sectional configuration of a circular arc segment. The side of biasing element 6 facing towards lever 2 is formed with a ramp configuration rising from the two end portions 7 towards a center portion 8, so that this center portion 8 forms the portion of biasing element 6 projecting furthest from frame portion 4. Biasing element 6 is suitably mounted in a recess of frame portion 4 and biased by a not shown resilient element, for instance a helical spring, in a direction away from frame portion 4 and towards lever 2. In the embodiment shown, recess 1 is of substantially uniform width, while lever 2 is formed of a round bar stock of circular cross-sectional shape, the lower portion of which facing towards recess 1 tapers in the engagement direction.

Figure 3:
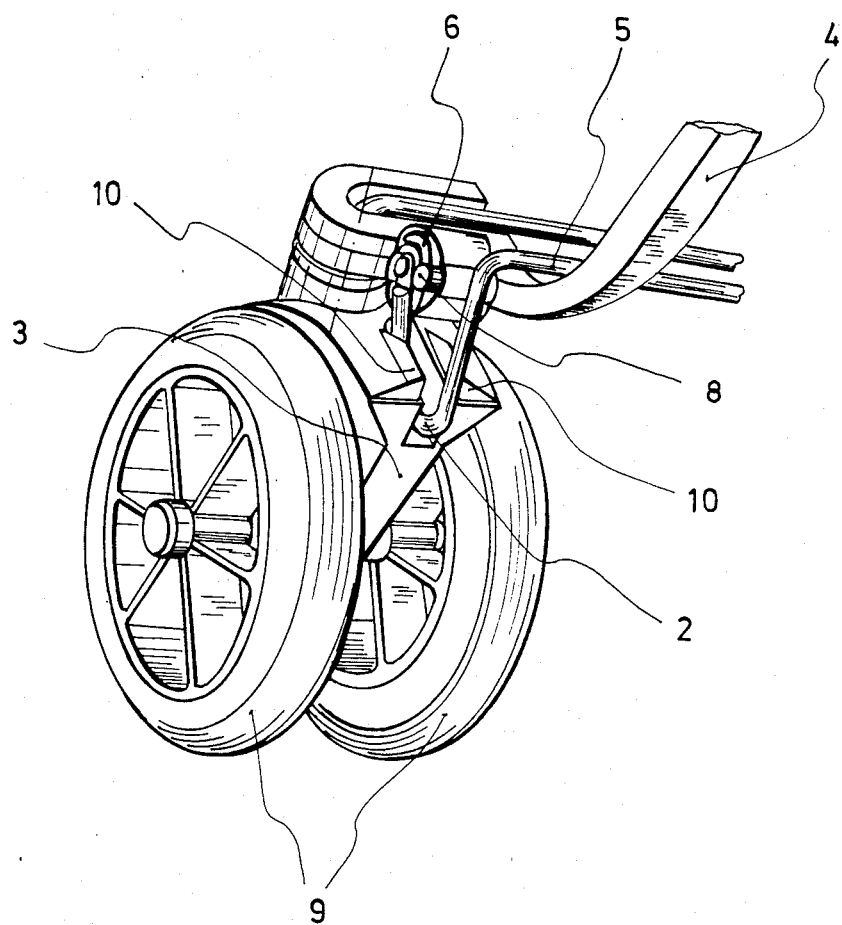
FIG. 3 shows a perspective view of the front wheel arrangement of FIG. 2, with locking means in the locking position.
Figure 4:
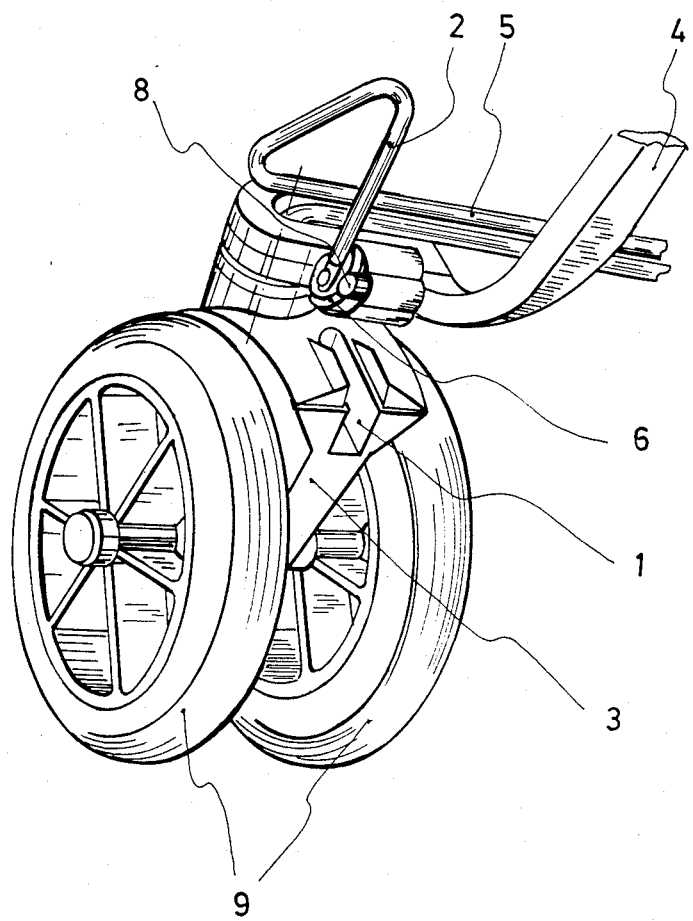
FIG. 4 shows a perspective view corresponding to FIG. 3, with the locking means in the disengaged position.

FIG. 3 shows a perspective view of lower frame portion 4 with axle support 3 mounted thereon for swiveling about the vertical axis and carrying the two front casters 9. As viewed in the direction towards the axle of front casters 9, the top surface of axle support 3 provided with recess 1 is substantially formed as a circular arc the center of which coincides with the axis of rotation of the front casters. The two lateral ramps 10 rising towards recess 1 are formed on the end portion of the arcuate top surface of axle support 3 facing in a direction opposite the riding direction.

FIG. 3 shows the locking means in its locked position with lever 2 received in recess 1. The ramp-shaped rising side surface of biasing element 6 is effective to bias lever 2 into engagement with recess 1. As shown in FIG. 3, the free end of lever 2 is bent upwards and joins a substantially horizontal portion forming a connecting bar 5 connected in a similar manner to the lever of the locking means of the other front wheel arrangement. It is thus ensured that both levers of both locking means are pivoted in synchronism with one another. In this manner it is further ensured that in the locked position of the two axle supports the axes of rotation of the front wheels on both sides of the perambulator are aligned with one another.

To arrive from the locked position of the locking means shown in FIG. 3 at the unlocked position, it is merely required to pivot one of the levers 2 or the connecting bar 5 in the counterclockwise direction as viewed in FIG. 3. This pivoting movement has to overcome the resistance of the biasing element 6, or the resistance, respectively, of the resilient element biasing the biasing element outwards in the direction towards lever 2, resulting in biasing element 6 being displaced towards frame portion 4. After passing the center portion 8 of biasing element 6, the respective portion of lever 2 engages the other ramp portion dropping away from center portion 8 to be thereby fully pivoted to the disengaged position and retained thereat.

FIG. 4 shows, in an illustration similar to that of FIG. 3, the lefthand front wheel arrangement of the perambulator in a position corresponding to the one shown in FIG. 3, i.e. the straight-ahead riding position. The locking means is shown in the disengaged position with lever 2 released from engagement with recess 1. Biasing element 6 is effective to retain lever 2 in this position.

For arriving from the disengaged position of the locking means shown in FIG. 4 to the locked position, all that is required is to pivot lever 2 in the clockwise direction as viewed in FIG. 4. This entails a lateral displacement of biasing element 6 until lever 2 rides over center portion 8 of biasing element 6. On further pivoting movement of lever 2 the ramp configuration of biasing element 6 is effective to promote this movement and to bias lever 2 in the direction towards recess 1 of axle support 3. If axle support 3 is at this time not in the position shown in FIG. 4, in which lever 2 is free to directly enter recess 1, all that is required is to push the perambulator over a small distance in the straight-ahead riding direction. The straight-ahead travel causes front wheels 9, due to their being designed as trailing casters, to swivel to a position in which their axes are aligned with one another and parallel to the rear wheel axes of the perambulator. During this aligment operation, lever 2 rides over the outer periphery of wheel 9 and lateral projection 11 onto lateral ramp 10 to drop into recess 1 as proper alignment of the front wheels is attained. As the two levers 2 are interconnected by connecting bar 5, the locking of the two locking means occurs simultaneously. Biasing element 6 is then effective to retain lever 2 securely in recess 1 so as to avoid the danger of the locking means being inadvertently released.

The present invention is not restricted to the embodiment shown by way of example. It is thus possible to provide the biasing element at another location or of a different design, for instance in the form of a toggle lever acting on the connecting bar. It is also possible to provide the lever and the recess cooperating therewith at another location or at a different spacing from the vertical swivel axis of the axle support.

I claim:

1. A perambulator comprising a collapsible frame, a pushing handle mounted on said frame for pushing the perambulator in a travel direction, four spaced apart wheel sets mounted to said frame, at least two of said wheel sets at one end of said frame each having an axle support mounted for swivelling about a vertical swivel axis to said frame, each axle support having a recess therein, said at least two wheel sets each having at least one wheel rotatably mounted to its axle support, locking means for engaging said at least two wheel sets for locking each of said at least two wheel sets in a fixed swivel position, said locking means comprising a locking lever for each of said at least two wheel sets, pivotally mounted to said frame between a locking position for engaging into the recess of one of said axle supports to hold the wheel set of that axle support in its fixed swivel position, and an unlocking position spaced away from the recess, each lever having an intermediate dead center position between its locking and unlocking positions, said locking means including a locking bar connected between said levers for each of said at least two wheel sets for pivoting said levers at the same time between their locking and unlocking positions, a pair of lateral ramps connected to each axle support on each side of said recess thereof, each lateral ramp being inclined upwardly in a direction toward said recess to form an opening therebetween into said recess, each ramp being engageable against one of said locking levers with said one locking lever in its locking position when the wheel set of that locking lever is out of its fixed swivel position and as the wheel set moves toward its fixed swivel position to initially move the lever away from the recess until the lever reaches the opening of the recess, and biasing means engaged against each lever for biasing each lever away from its dead center position to bias each lever away from its recess with each lever in its unlocking position, and into its recess with each lever in its locking position, said ramps engaging against said levers with swivelling of said wheel sets for urging said levers in a direction away from the biasing force of said biasing means.

2. A perambulator according to claim 1, wherein said handle is movably mounted between two positions on said frame for pushing the perambulator forwardly in a travel direction and rearwardly opposite to said travel direction, a remaining two of said four wheel sets each having an axle support mounted for swivelling about a vertical swivel axis to said frame, and additional locking means engageable with said axle supports of said remaining two wheel sets for locking said remaining two wheel sets in fixed swivel positions.

3. A perambulator according to claim 1, wherein said recess (1) is of convergent configuration.

4. A perambulator according to claim 1, wherein at least that portion of said lever (2) adapted to be engaged with said recess (1) is of circular cross-sectional shape.

5. A perambulator according to claim 1, wherein said biasing means comprises a bias element (6) mounted for movement parallel to the pivot axis of said lever (2) and biased by a resilient element in the direction towards said lever (2).

6. A perambulator according to claim 5, wherein said biasing element (6) has in the cross-sectional configuration of a circular arc segment having its center at the pivot axis of said lever (2).

7. A perambulator according to claim 6, wherein a side of said biasing element (6) facing towards said lever (2) is formed with a ramp configuration rising in circumferential direction from two end portions (7) towards a center portion (8) thereof.

8. A perambulator according to claim 1, wherein said locking means is disposed to the rear of the vertival swivel axis as seen in the direction of travel.

9. A perambulator according to claim 1, wherein the portion of said axle support (3) formed with said recess (1) is designed to partially extend over said wheels (9).

10. A perambulator according to claim 1, said biasing news including a biased element moveably mounted in a direction parallel to the pivot axis of said lever, said biased element having an arcuate shape centered about the pivot axis of the lever, said arcuate shape having opposite end portions and a center portion, said biased element having a surface which is inclined toward said lever in a direction from each of said end portions toward said center portion, said lever being biased on one side of said center portion in a direction away from said recess and on an opposite side of said center portion in a direction into engagement with said recess.

11. A perambulator according to claim 10 including two wheels rotatably mounted to each axle support on opposite sides of said recess, each axle support having opposite extensions extending on opposite sides of said recess and over each of said two wheels respectively.

12. A perambulator according to claim 1 wherein said extensions are arcuate in shape and follow part of a circumference of each wheel rotatabley mounted to said axle support.

* * * * *